May 9, 1967 C. M. MULLIS ETAL 3,318,432
WHEELED TRANSPORTATION ASSEMBLIES

Filed Sept. 22, 1965 2 Sheets-Sheet 1

INVENTORS
Clyde M. Mullis, Larry Tosato
& Robert A. Bogyo
BY
C. L. Freedman
ATTORNEY

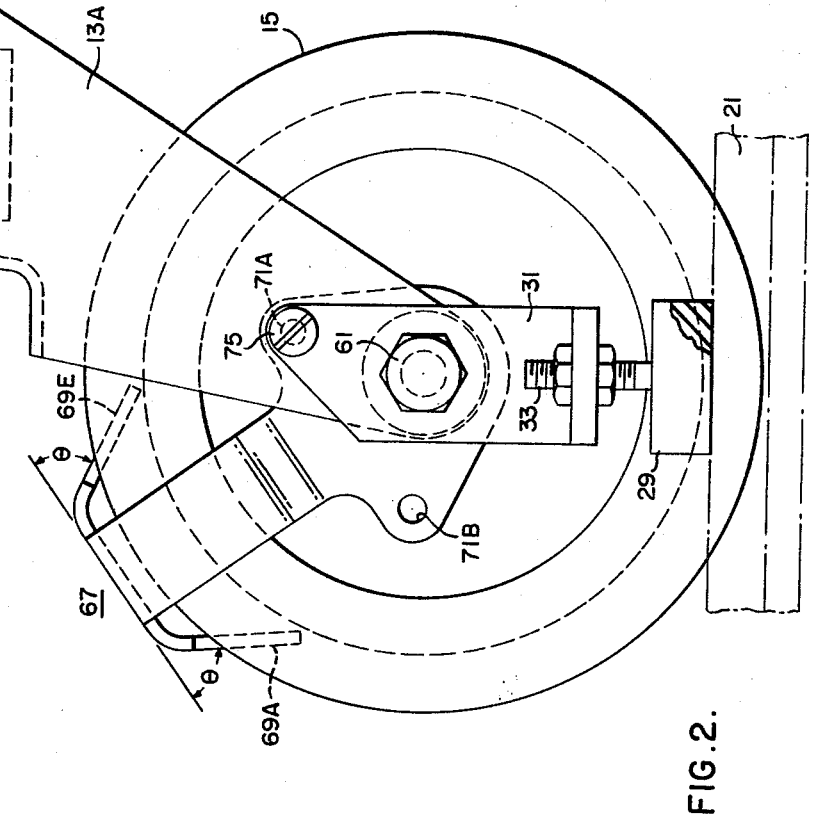

United States Patent Office 3,318,432
Patented May 9, 1967

3,318,432
WHEELED TRANSPORTATION ASSEMBLIES
Clyde M. Mullis, Glen Rock, Larry Tosato, Millburn, and Robert A. Bogyo, Paramus, N.J., assignors to Westinghouse Electric Corporation, Pittsburgh, Pa., a corporation of Pennsylvania
Filed Sept. 22, 1965, Ser. No. 489,199
12 Claims. (Cl. 198—16)

This invention relates to transportation assemblies employing cleated wheels and it has particular relation to the provision of cleaning devices for such wheels.

Although the invention may be applied to cleated wheels employed in various types of transportation assemblies it is particularly suitable for shopping carts employing cleated wheels for use on moving walks of the type employing cleated treadways. For this reason the invention will be described as applied to such shopping carts.

In accordance with the invention a cleaner is provided for the grooves between the cleats of the wheels of a shopping cart. The cleaner is effective for each direction of rotation of the wheel.

In a preferred embodiment of the invention the cleaner is supported by the bracket which also supports the wheel. With this arrangement the wheel tread may be adjusted and the cleaner may be maintained in proper mesh with the wheel cleats. Moreover, the cleaner may be employed with caster wheels without interference with the caster operation of such wheels.

It is therefore an object of the invention to provide an improved cleated wheel transportation device having a cleaner effective for cleaning the grooves between the wheel cleats.

It is another object of the invention to provide a cleated wheel having a cleaner effective for cleaning the grooves between the wheel cleats for each direction of rotation of the wheel.

It is an additional object of the invention to provide a bracket-mounted cleated-wheel device having a cleaner for the grooves between the wheel cleats which is supported by such bracket.

Other objects of the invention will be apparent from the following description taken in conjunction with the accompanying drawings, in which:

FIG. 2 is a view in side elevation showing the front wheel assembly of the cart of FIG. 1;

FIG. 3 is a view in front elevation with parts broken away of the wheel assembly shown in FIG. 2;

FIG. 3A is a view in section with parts broken away of a wheel assembly;

Figure 1:
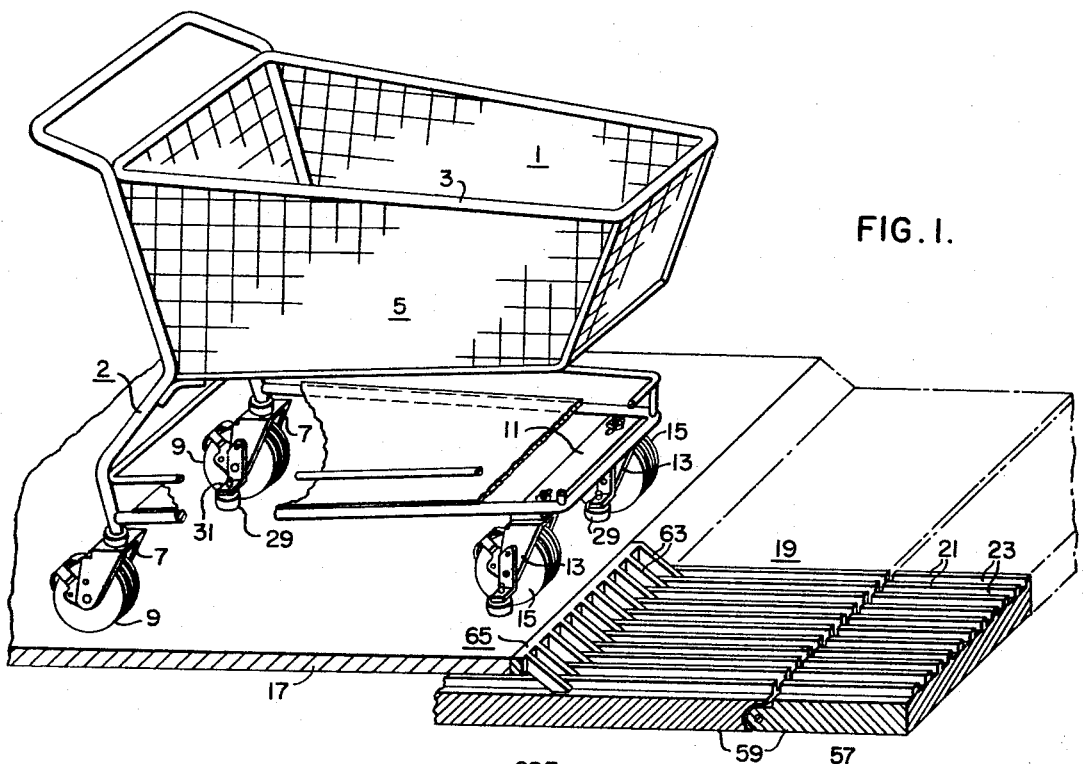
FIGURE 1 is a view in perspective with parts broken away showing a shopping cart embodying the invention associated with a moving walk.

Referring to the drawings, FIG. 1 illustrates a shopping cart 1 having a frame 2 comprising frame members 3 for supporting a basket 5. Mounted to the bottom of the frame for rotation about a common axis by means of a pair of fixed U-shaped axle support members 7 are a pair of rear wheels 9. A front plate 11 secured to the bottom of the frame 2 mounts a pair of U-shaped swivel axle support members 13 for a pair of front wheels 15, the members 13 and the wheels 15 constituting casters. The general construction of such carts is well known and it appears unnecessary to describe it further.

In FIG. 1, the cart 1 is disposed on a portion of a smooth surface 17 such as the floor of a supermarket, wherein it may be pushed along in the normal manner. The cart is shown in front of a surface 19 formed of uniform and parallel cleats 21, which alternate with uniform grooves 23. The cleated surface 19 may represent, for example, an extension of the surface 17 adjacent an exit of a supermarket, or it may represent the load carrying surface or treadway of a moving walk which is disposed for uniform movement in a direction parallel to its cleats. While such a treadway may be constructed of a flexible material such as rubber, preferably it is fabricated of metal, e.g., aluminum or steel. Although the surface 19 may be horizontal, it also will be understood that it may be inclined.

One or more of the cart wheels include means for restraining movement of the cart relative to the cleats 21. Thus, as is shown clearly in FIG. 3, each of the wheels 9 and 15, which may be fabricated of a relatively hard material having suitable wearing properties such as a phenolic resin, comprises a hub 25, on which is formed two or more peripheral cleats 27 (four are shown), the cleats 27 having a larger outside diameter than the hub 25 to form a peripheral groove 28 between each pair of cleats. The cleats 27 are spaced by the grooves 28 and proportioned such that they may intermesh loosely with adjacent ones of the cleats 21. It will be apparent that upon occurrence of such intermesh, the cart 1 occupies a lower position than otherwise is the case, as when it is disposed on the smooth surface 17 and the outermost surfaces of the cleats 27 bear the load of the cart and its contents, if any.

Inwardly adjacent each of the wheels 9 and 15 is a pad 29. If the cleated surface 19 is metallic, the pads 29 preferably are formed of friction braking material such as rubber. Conversely, if the surface 19 is fabricated of rubber, the pads may be metallic. Inasmuch as the former construction is preferred, it will be assumed that such is the case.

Each of the brake pads 29 conveniently may be mounted as by means of a bracket 31 on the associated wheel axle support member 7 or 13. It will be observed in FIG. 3 that each pad is so positioned that its bottom surface 30 engages a portion of the cleated surface 19 when the peripheral cleats 27 of its associated wheel intermesh with a portion of the cleats 21 as aforesaid. Although each of the pads 29 may be configured to contact only one of the cleats 21, preferably the bottom surface of each pad is flat and is proportioned to engage a plurality of such cleats for a number of reasons such as minimizing pad wear and providing smoother operation.

In order for the brake pads 29 to achieve maximum braking efficiency, the peripheral wheel cleats 27 should be prevented from touching the bottoms of the grooves 23 within which they are located, and the top surface of each cleat 21 which is disposed within one of the peripheral wheel grooves 28 should be prohibited from engaging the associated hub 25. For this purpose, each pad may be fixedly mounted in the correct position as by molding or otherwise securing it directly to its bracket 31, or the pad may be made adjustable relative to the bracket. To provide for slight variations in the sizes of the parts and for wear and tear thereon, each pad conveniently is adjustable vertically, as by means of a threaded stud 33 and a locking nut 35.

For braking the cart 1 on a horizontal cleated surface, it may be sufficient to provide peripheral cleats and a brake pad or pads for only the rear wheels thereof. Additional braking force may be required, however, when the cart is located on an inclined cleated surface to insure that it remains stationary with respect thereto. For this reason, each of the wheels 9 and 15 preferably is of cleated construction. By mounting the front brake pads on the swivel axle support members 13 rather than on the adjacent cart frame member or members 3 or on the swivel support plate 11 the pads rotate with the casters. Otherwise, the pads 29 for the front wheels must be spaced from the casters sufficiently to permit full rotation thereof without interference, thus taking up more space.

In order to provide balanced braking forces for the front casters when the cart is braked and thus to prevent a tendency for the casters to rotate and thereby to effect demeshing of the wheel and load carrying surface cleats, each of the casters has an inwardly and an outwardly disposed brake pad 29. A plurality of cleats on the wheels are deemed desirable in order to minimize the effect of surface irregularities when the cart is disposed on a non-cleated surface and to decrease the load on each cleat, thus reducing cleat wear and tear.

A modern moving walk having a cleated treadway preferably is provided with a comb plate at each landing thereof. Each comb plate has teeth which intermesh with the cleats of the treadway. Such teeth have top surfaces which rise from a position wholly within the treadway grooves to a position above the cleats thereof in order to comb-out objects which may be disposed between the cleats and to provide for a smooth transfer of load between the moving walk and the associated landing. In addition, while aspects of the invention may be utilized in transportation systems having cleated moving walks constructed of flexible material, they are especially desirable when employed in systems embodying cleated metallic walks of rigid construction, and more particularly articulated or palletized moving walks. Referring to FIG. 1, for example, a portion of such a moving walk 57 is illustrated schematically at the right-hand end of the noncleated surface 17. The walk 57 comprises an articulated belt formed of an endless series of rigid metallic platforms or pallets 59. Each platform has a plurality of load-carrying parallel spaced cleats 21 running in the direction of belt travel. These cleats intermesh with teeth 63 of a landing comb plate 65 as the associated platform passes under the comb plate. For a more complete description of this type of moving walk, reference may be made to the Lennius R. Rissler and Clyde M. Mullis Patent No. 3,191,-743, which issued June 29, 1965. Thus, if the cart 1 is being transported by such a moving walk and if its braked in either of the manners described above, when it arrives at the exit landing of the walk the teeth of the landing comb plate comb the cart wheel cleats from between the treadway cleats and disengage the cart braking surfaces from the walk treadway, thereby terminating the braking of the cart and allowing it to be pushed in the normal manner.

By reference to FIG. 3, it will be noted that the wheel 15 is provided with an axial bore 15A into which two flanged bearing bushings 15B and 15C are pressed or otherwise secured. These bushings may be constructed of any suitable bearing material. In a preferred construction they are made of an oil-impregnated metal bearing material.

The bushings are rotatably mounted relative to a sleeve 66 which has a flange 66A abutting the flange of the bushing 15C. To space the wheel from the leg 13B the flange of the sleeve is snugly received in the hole 73. A washer 64 spaces the sleeve 66 from the leg 13A. A bolt 61 passes through the sleeve 66, the washer 64, openings in the legs 13A and 13B and openings in the brackets 31. Thus the bolt compresses the sleeve 66 and the washer 64 between the legs 13A and 13B. The spacing between the head 66A and the washer 64 provides a small running clearance to permit free rotation of the wheel 15 and its bushings about the sleeve 66.

The washer 64 and the head 66A have different axial lengths denoted by the reference characters $a$ and $b$. For illustrative purposes the dimension $b$ is substantially larger than the dimension $a$.

Moreover, a plane transverse to the axis of the wheel and located at the center of the wheel rim is spaced from a parallel plane located at the center of the wheel hub by a distance $d$. Thus the axial position of the wheel may be shifted by a distance $2d$ by rotating the wheel 180° about a veritcal axis as viewed in FIG. 3A relative to the sleeve 66. Also the wheel may be shifted axially through a distance $b-a$ by rotating the sleeve 66 and washer 64 180° about a vertical axis as viewed in FIG. 3 relative to the wheel. By recourse to either or both of these adjustments for each wheel of say a front pair, the wheels may be spaced to match their cleats with the treadway grooves.

Figure 4:
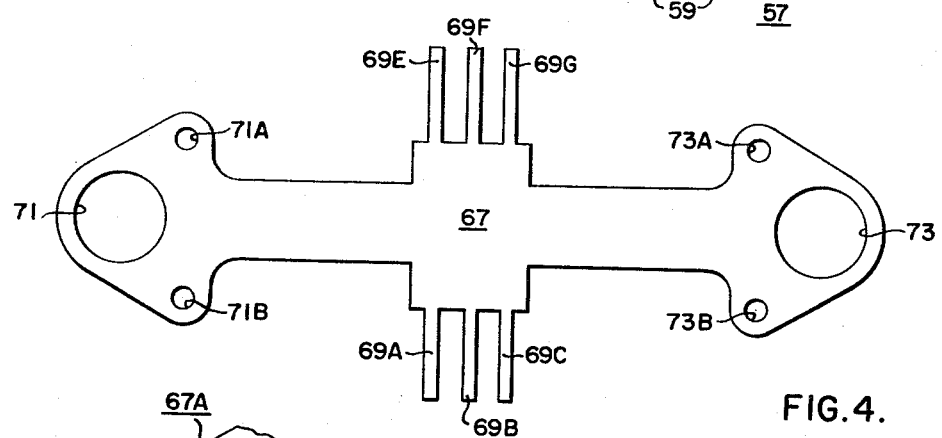
FIG. 4 is a view in top plan of a shape sheet of metal which is employed for constructing a cleaner employed in the wheel assembly of FIGS. 2 and 3.

In order to clean the grooves 28 of the wheel 15 a cleaner 67 is provided which is shown in developed form in FIG. 4. Conveniently, the form shown in FIG. 4 may be stamped or cut from a sheet of rigid material such as steel. The cleaner 67 provides six cleaning teeth 69A, 69B, 69C, 69E, 69F and 69G arranged in pairs which project in opposite directions from the center of the cleaner. Two large openings 71 and 73 are provided at the ends of the cleaner. Two small openings 71A and 71B are located adjacent the larger openings 71. Similarly two small openings 73A and 73B are located near the larger opening 73.

The formed sheet metal of FIG. 4 is bent into the U-shaped configuration shown in FIGS. 2 and 3. In this configuration the two openings 71 and 73 are positioned to receive snugly the washer 64 and the flange 66A respectively thus locating the cleaner with respect to the axis of the wheel. In addition a bolt 75 passes through the opening 71A and openings in the leg 13A and the bracket 31 to secure these parts together. A similar bolt 77 passes through the opening 73A and openings in the leg 13B and the bracket 31 adjacent thereto for the purpose of securing these parts together. Spacing washers 78 may be employed as required.

The teeth 69A, 69B and 69C are bent toward the axis of the wheel to enter the associated grooves 28 of the wheel. These teeth may be bent through a suitable angle $\theta$ such as 57°. In an analogous manner the teeth 69E, 69F and 69G are bent toward the axis of the wheel to enter the corresponding grooves.

By inspection of FIG. 2 it will be noted that the cleaner is effective for each direction of rotation of the wheel. This construction makes it impossible for foreign matter to be compacted by the cleaner into the grooves.

The support member 13 in FIG. 3, the brackets 31, the wheel 15 and the cleaner 67 form a compact unit which may be readily shifted to adjust the tread of the wheel without changing the required registry of the parts in the compact assembly. The assembly is secured to the front plate 11 by a threaded stud 81 which passes through an opening 83 in the front plate 11. A nut 83 then may be employed for securing the stud 81 in mounted position. When the wheel and/or the sleeve 66 and the washer 64 are rotated as noted above to shift the axial position of the wheel, the cleaner 67 may be rotated with the wheel and/or the sleeve, and washers such as the washers 78 may be employed to maintain the cleaner in registry with the wheel cleats.

It will be noted that the cleaner 67 for each of the wheels removes foreign matter from the associated grooves. In addition, the comb 63 (FIG. 1) acts to clean the grooves of the treadway of the moving walk. Thus, the wheel cleaners and the comb coact to maintain the cooperating parts in clean condition.

Figure 5:
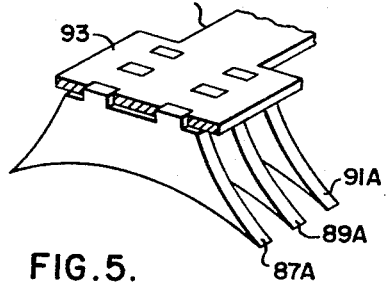
FIG. 5 is a detailed view in perspective showing a modified construction of a cleaner suitable for a cleated wheel.

FIG. 5 shows a cleaner 67A which is similar in construction to that represented by FIG. 4 except for the replacement of the fingers 69A to 69G of FIG. 4 by three contoured plates 87A, 89A and 91A which may be staked to the sheet steel member 93 employed for the remainder of the cleaner 67A.

Each of the plates 87A, 89A and 91A is contoured to fit within one of the wheel grooves, and to form a beveled edge at each end which acts to provide a cleaning action for each direction of rotation of the wheel.

Although the invention has been described with reference to certain specific embodiments thereof, numerous modifications falling within the spirit and scope of the invention are possible.

We claim as our invention:

1. In a transportation assembly, a moving walk having a cleated treadway, said treadway having a portion exposed to carry load relative to a first landing, a landing comb at said landing having teeth meshing with the cleats of said treadway to assist in guiding load between the landing and the treadway and to clear debris from the grooves between said cleats, a cart having a load-bearing body and a supporting wheel having a horizontal axis, said wheel being provided with a pair of axially-spaced rim cleats which are circular about the axis of the wheel for meshing with the cleats of the treadway and for supporting the cart on a smooth surface, wheel-supporting means mounted on said cart body, means mounting the wheel on the supporting means for rotation about the wheel axis, and cleaning means comprising a wheel cleaner associated with the wheel-supporting means, said cleaner having a pair of teeth extending in opposite directions about the wheel axis into the groove between said rim cleats, whereby the last-named teeth clean foreign matter out of said groove in each direction of rotation of the wheel about its axis.

2. An assembly as claimed in claim 1 wherein said wheel is a caster wheel, said wheel-supporting means having a caster mounting permitting caster rotation of the wheel-supporting means relative to the cart body about a substantially vertical axis, whereby said wheel cleaner and wheel rotate as a unit about said substantially vertical axis.

3. An assembly as claimed in claim 2 in combination with a pair of brake pads secured to said wheel supporting means on opposite sides of the wheel, said brake pads having brake surfaces spaced above a smooth horizontal surface on which the wheel rests by a distance which is less than the height of said cleats, whereby when the cleats of the wheel and treadway are meshed the brake surfaces engage upper surfaces of the treadway cleats to inhibit relative motion therebetween, said wheel, wheel-supporting means, wheel cleaner and brake pads rotating as a unit about said substantially vertical axis.

4. The assembly of claim 1 wherein said wheel cleaner is located so as to enter the groove of said wheel in the upper rear quadrant of said wheel relative to said cart.

5. The assembly of claim 1 wherein the teeth substantially bridge the dimension of said groove parallel to the axis.

6. An assembly as claimed in claim 1 in combination with a brake pad secured to said wheel supporting means, said brake pad having a brake surface spaced above a smooth horizontal surface on which the wheel rests by a distance which is less than the height of said cleats, whereby when the cleats of the wheel and treadway are meshed the brake surface engages the upper surfaces of the treadway cleats to inhibit relative motion therebetween.

7. In a transportation assembly, a moving sidewalk having a cleated treadway, said treadway having a portion exposed to carry load relative to a first landing, a landing comb at said landing having teeth meshing with the cleats of said treadway to assist in guiding load between the landing and the treadway and to clear debris from the grooves between said cleats, a cart having a load-bearing body and a supporting wheel having a horizontal axis, said wheel being equipped with a rim cleat circular about the axis of said wheel for meshing with the cleats of the treadway and for supporting said cart on a smooth surface, wheel supporting means mounted on said cart body, means mounting the wheel on the supporting means for rotation about the wheel axis, and cleaning means for removing foreign matter from the two grooves formed by the lips of the wheel rim on either side of said cleat and the sides of said cleat comprising a cleaner having two pairs of teeth, the first pair being positioned on a first side of said cleat, the second pair being positioned on the second side of said cleat, a first tooth of said first pair extending from a position external to said wheel in one direction about the axis of the wheel into a first of said grooves, the second tooth of said first pair extending in the opposite direction about said wheel into said first groove, the two teeth of said second pair of teeth being similarly disposed with respect to said wheel so that they extend in opposite directions into the second of said grooves whereby said teeth clean foreign matter out of said grooves in each direction of rotation of the wheel about its axis.

8. A transportation assembly comprising a structure with a cleated surface, a cart having a load-bearing body and two supporting wheels, said wheels being provided with a pair of axially-spaced rim cleats which are circular about the axes of the wheels for meshing with the cleated surface, supporting means connecting said wheels to said cart with lateral displacement between the wheels to form a wheel tread, said support means including means mounting said wheels for rotation about the wheel axes, a plane transverse to the axis of a first wheel through the center of the cleats being axially displaced from a parallel plane through the center of the hub of said first wheel so that when said first wheel is reversed with respect to its support means the tread will be altered, and cleaning means for each cleated wheel for cleaning the grooves formed by the cleats, said cleaning means comprising a cleaner having a pair of teeth each extending from a position external to the associated wheel in opposite directions about the axis of the associated wheel into the associated groove, and means securing the cleaners to the support means whereby the teeth clean foreign matter out of said grooves in response to rotation of the wheels in each direction about their axes.

9. An assembly as claimed in claim 8 wherein said securing means comprises a U-shaped bracket extending around the rim of the wheel and having an opening in each leg of said bracket, said mounting means including parts concentric with said wheel which extend through said openings to assist in positioning the cleaner so that the wheel and cleaner may be manipulated as a unit.

10. The assembly as claimed in claim 9 with an additional opening in each leg of said bracket, the centers of said additional openings being positioned on lines through the centers of said first-mentioned openings said lines being positioned at an acute angle to the portions of the centerlines of said legs between said first-mentioned openings and the cross bar of said U-shaped bracket, said additional openings being provided to permit said bracket to be connected to said support means in order to assure positive positioning of said cleaner.

11. An assembly as claimed in claim 10 with a further additional opening on each of said legs positioned on lines through the center of said first-mentioned opening and at the same acute angle with respect to said centerlines of said legs but on the other side of said centerlines, said further additional openings being provided to permit the cleaner to be maintained in the same position relative to the body of a vehicle to which the wheel assembly is attached when the wheel and cleaner assembly is rotated 180° about the axis through the centerline of said bracket.

12. A transportation assembly comprising a structure with a cleated surface, a cart having a load-bearing body and two supporting wheels, said wheels being provided with a pair of axially-spaced rim cleats which are circular about the axes of the wheels for meshing with the cleated surface, support means connecting said wheels to said cart with lateral displacement between the wheels to form a wheel tread, said support means including mounting means comprising a cylindrical sleeve having a flange on one end, and a washer of a thickness which is different from the thickness of said flange, said sleeve being inserted through the axis of the associated wheel so that said flange provides running clearance between said wheel and said support means, said washer being positioned at the other end of said sleeve to provide running clearance on that end of the sleeve between the associated wheel and said support means so that when said sleeve and washer assembly is reversed with respect to the associated wheel the tread will be altered, and cleaning means for each cleated wheel for cleaning the grooves formed by the cleats, said cleaning means comprising a cleaner having a pair of teeth each extending from a position external to the associated wheel in opposite directions about the axis of the associated wheel into the associated groove, and means securing the cleaners to the support means whereby the teeth clean foreign matter out of said grooves in response to rotation of the wheels in each direction about their axes.

References Cited by the Examiner

UNITED STATES PATENTS

| | | | |
|---|---|---|---|
| 1,690,922 | 11/1928 | Brack. | |
| 2,509,807 | 5/1950 | Carlton | 280—158 |
| 3,146,872 | 9/1964 | Prucha | 198—16 |

FOREIGN PATENTS 18,899  10/1929  Australia.

EVON C. BLUNK, *Primary Examiner.*

R. F. HICKEY, *Assistant Examiner.*